Figure 1:
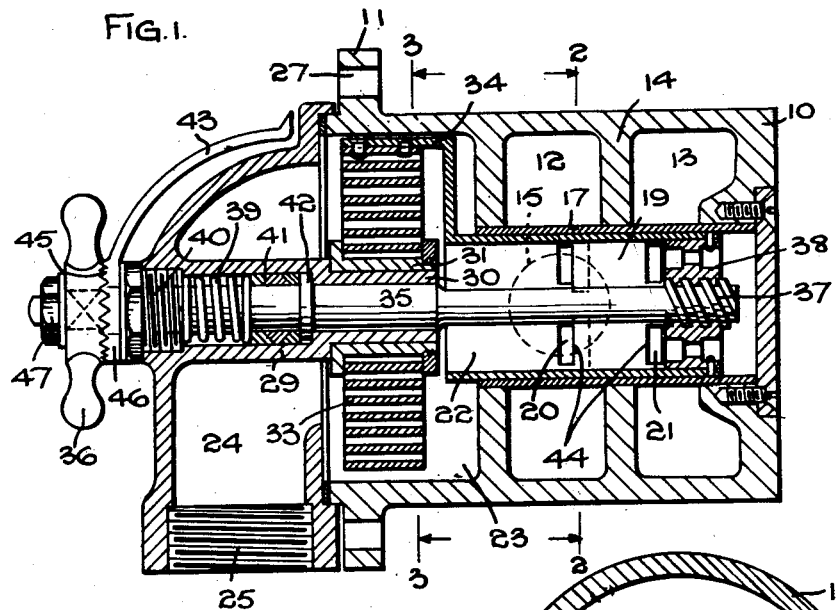

July 15, 1952 P. G. TACCHI 2,603,420
THERMOSTATICALLY CONTROLLED MIXING VALVE
Filed May 7, 1951 2 SHEETS—SHEET 1

INVENTOR
Percy George Tacchi
BY Richardson, ...and...
his AGENTS.

Patented July 15, 1952

2,603,420

UNITED STATES PATENT OFFICE 2,603,420

THERMOSTATICALLY CONTROLLED MIXING VALVE

Percy George Tacchi, Longs, North Curry, Taunton, England

Application May 7, 1951, Serial No. 224,865
In Great Britain October 7, 1948

5 Claims. (Cl. 236—12)

This invention relates to thermoplastically controlled mixing valves of the kind in which two or more fluids at differing temperatures are supplied to a mixing chamber in which mixture of the fluids is effected, the valve being provided with a thermally responsive element adapted to change its shape in response to variation of temperature of the mixture and arranged to actuate valve means comprising a movable valve member for controlling the relative proportions of the fluids supplied so that the resultant fluid mixture is maintained at a predetermined given temperature.

A number of mixing valves of the foregoing kind have already been proposed in which one end of the thermally responsive element is connected to the valve member, the other end of the thermally responsive element being connected to an adjusting member mounted movably on the valve body and provided for the purpose of adjusting the relative proportions of the fluids at a given temperature. In such an arrangement the adjusting movement is transmitted from the adjusting member through the thermally responsive element to the valve member so that the possibility arises of the thermally responsive element which is necessarily of relatively delicate construction, being strained or otherwise damaged with such an arrangement.

Further, with this arrangement, owing to the flexible nature of the thermally responsive element and the frictional resistance offered by the valve member there arises lost motion between the adjusting member and the valve member which will have an adverse effect on the accuracy of setting of the adjusting member.

The present invention has for its object the provision of an improved arrangement in which the foregoing disadvantages of the known construction above referred to is avoided and in which a variation of pressure of one or more of the fluids supplied to the valve does not of itself directly interfere with the effective operation of the thermally responsive element and of the valve means so that the fluid mixture is still maintained at the predetermined given temperature.

According to the present invention I provide a mixing valve comprising a body including a plurality of supply openings each for supplying one of the fluids to be mixed, a mixing chamber in which mixture of the fluids is effected, a discharge opening for discharging the mixture from the mixing chamber, a thermally responsive element adapted to change its shape in response to variation of temperature of the mixture, and being arranged so as to permit of the mixture flowing in contact therewith, one end of said thermally responsive element being connected to the body and the other end being operatively connected to a valve member mounted within the casing and having one or more ports adapted to control the supply of one or more fluids to the mixing chamber, the arrangement being such that the valve member is displaced in consequence of change of shape of the thermally responsive element to vary the flow of the fluid controlled by said ports, and the latter being so arranged in relation to the direction of operative displacement of the valve member as to ensure that the pressure exerted by the fluid when passing through said ports does not produce any substantial resultant thrust acting in the direction of operative displacement of said valve member so as to displace the valve member or thermally responsive element, and means being provided for adjusting the operation of the valve, so as to vary the relative proportions of the mixture, said adjusting means operating directly between the valve body and the valve member so that the adjusting movement can be transmitted directly to the valve member without passing through the thermally responsive element.

In a more specific form, the invention consists in a mixing valve which is mounted for both rotational and axial movement and a screw threaded connection is provided between the valve member and the body adapted to prevent the valve member being displaced out of its given operative position under fluid pressure, acting on the edges of the valve member ports.

A further object of the present invention is to provide certain improvements whereby the size of the valve may be reduced, and consequently the cost, without sacrifice of the efficiency of the valve.

According to a further feature of the present invention the ports in the cylindrical valve member and the seating member are in the form of elongated openings or rows of openings, the major axis of an elongated opening or the line of a row of openings being inclined to the axial direction in which the valve member moves, the direction of inclination being the same for all the ports so that the rotational component of the relative movement between the valve member and its seating is utilized in displacing the openings or rows of openings on the valve member relative to the corresponding openings in the seating in a direction transverse to the major axes of the opening or the lines of rows of openings.

The invention is illustrated in the accompanying drawings, wherein:

Figure 1 is a sectional side elevation of one form of mixing valve constructed in accordance with the present invention.

Figure 2:
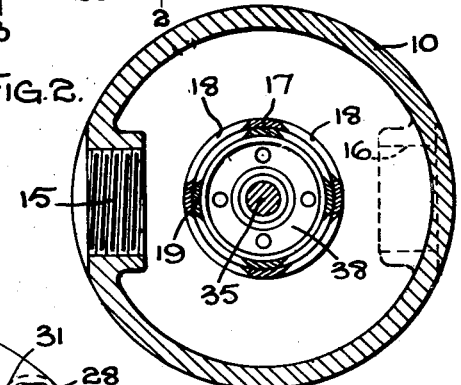
Figure 3:
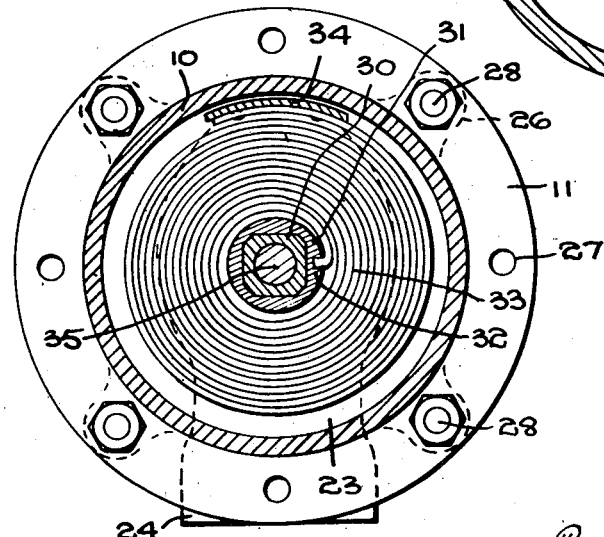

Figures 2 and 3 are sectional views on the lines 2—2 and 3—3 respectively of Figure 1.

Figure 4:
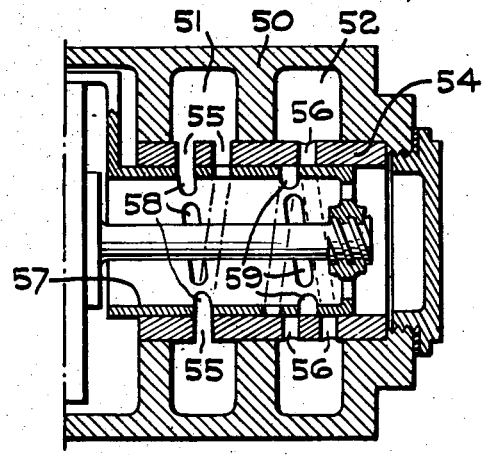
Figure 5:
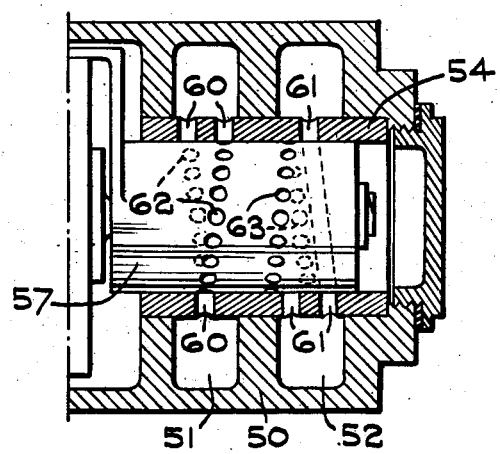

Figures 4 and 5 are sections through the valve member and seating and showing two forms of an improved type of valve member with an arrangement of ports which provides a complete valve of smaller dimensions without loss of efficiency.

Referring to the drawings, the mixing valve there illustrated is intended for use in obtaining a supply of hot water from a supply of steam and cold water and such valve comprises a body 10 of substantially cylindrical configuration provided at one end with a number of attachment flanges 11 for securing it to a convenient support, the body at a position spaced from such flanges being formed internally with a pair of fluid supply passages 12, 13 of annular configuration spaced apart axially of the body and separated by a relatively thin thermally conducting wall 14 forming part of the body. One of these passages, for example, the passage 12, is provided in the peripheral wall of the body with a supply opening 15 for connection to a water supply pipe, the other passage, conveniently the passage 13, being provided similarly with a supply opening 16 for connection to a suitable steam supply pipe.

The thermally conducting wall serves to permit of a certain initial transfer of heat from the steam to the cold water for the purpose above indicated. This wall may be of corrugated or finned configuration so as to increase its thermal conductivity for this purpose. Also the wall serves to cause the deposit of any solid matter from the heated water before it reaches the ports and valve member.

The inner wall of each of the annular passages 12, 13 is constituted by a sleeve-like valve seating member 17 which is formed at positions corresponding to each of the annular passages 12, 13 with a number of circumferentially spaced openings 18 (or if desired with a single continuous opening of part-circular configuration), which openings serve to admit the two fluids, namely, steam and water, to a valve member 19 of hollow cylindrical form mounted rotatably within the seating member 17 so as to be in fluid-tight engagement therewith, the valve member 19 being capable also of being displaced axially through a limited distance relative to the seating member.

This valve member 19 is provided with two sets of ports 20 and 21 which form respectively water and steam ports and are spaced apart axially of the valve member by a distance greater than the axial spacing of the two sets of openings 18 in the valve seating and these ports 20 and 21 serve to admit fluid from the corresponding openings 18 into the interior of the valve member which interior serves as a mixing chamber indicated at 22 in which the two fluids, i. e. the steam and water are mixed together. It will be appreciated that the axial spacing of the valve member ports could be less than the axial spacing of the ports in the seating (as is the case in Figures 4 and 5 hereinafter described). In either case the difference in spacing may be approximately equal to the width of a port.

The axial length of each set of ports 20 is preferably somewhat greater than the axial length of the corresponding opening which they control and where a single opening 18 is provided for each of the annular passages 12, 13 a single corresponding port may be provided in the valve member, but in the preferred arrangement illustrated the four circumferentially spaced openings 18 are provided for each annular passage with a corresponding number of similarly spaced ports 20 and 21, for example, as shown in Figure 2.

The mixing chamber 22 formed by the hollow interior of the valve member communicates with a chamber 23 for receiving a thermally responsive element which chamber is formed integrally with the end of the body adjacent the attachment flange 11 and the end of this chamber which is remote from the valve member 19 is open and communicates with the interior of a mixture discharge member 24 mounted on the adjacent end of the body 10 in fluid tight engagement therewith, the member being provided at one side with a radially directed hot water discharge orifice 25 through which the hot water formed by the mixture of the steam and cold water is discharged.

Conveniently the discharge member is mounted adjustably on the body by providing the member with a number of spaced peripheral lugs 26 adapted to be secured to the attachment flange 11 in different angular positions by forming the flange 11 with a large number of circumferentially spaced holes 27 to receive fixing screws 28 as shown in Figure 3, so that the discharge member can occupy different angular positions relative to the body 10 according to the direction in which it is desired to discharge the mixed fluid when the apparatus is first set up.

The discharge member 24 is formed centrally with a tubular bearing portion 29 which extends axially into the interior of the thermostat chamber, such tubular portion having its inner end of reduced section and substantially square configuration externally as indicated at 30 in Figure 3, upon which is non-rotatably mounted a sleeve 31 formed peripherally with a slot 32 in which is anchored the inner end of a spirally coiled length of bi-metal strip which forms the thermally responsive element 33. The outer end of this strip is anchored to a lug 34 formed integrally with the adjacent end of the valve member 19. The adjacent turns of the coiled strip are spaced apart a sufficient distance to permit of free relative movement of the adjacent turns, as well as to permit of the mixed fluid flowing through the interior of the thermally responsive element between adjacent turns of the coil. The thermally responsive element 33 is provided with a sufficient number of coil turns as to ensure that the outer end of the coil can move axially in relation to the inner end thereof when the valve member 19 is displaced axially without fear of significant distortion of the thermally responsive element occurring.

The arrangement is such that the fluid mixture passing through the thermally responsive element chamber 23 flows between substantially the whole of the coils forming the thermally responsive element which element is in the direct line of flow of the fluid from the mixing chamber to the discharge member, so that in the event of a change of temperature occurring within the mixing chamber, such temperature change is transmitted almost immediately to substantially the entire length of the coiled bi-metal strip, which is correspondingly immediately responsive to such temperature change.

The ports in the valve member are radial with respect to the longitudinal axis of the cylindrical valve body, while the direction of flow of the fluid mixture between adjacent coils of the bi-metal strip is parallel to such axis and there is thus little likelihood of individual unmixed fluids flowing directly from either of the valve member ports on to any parts of the thermally responsive element so as to subject this to local variation in temperature, and the possibility of such occurrence is still further reduced by the fact that both sets of valve member ports are spaced axially by an appreciable distance in relation to the adjacent end of the coiled bi-metal strip.

Mounted rotatably within the tubular bearing portion is an adjusting member 25 in the form of a spindle, one end of which projects beyond the discharge member 24 and carries an operating handle 36, the other end of the spindle extending along the central longitudinal axis of the cylindrical body and being formed at its extremity with a multi-start screwthread 37 conveniently of square or buttress configuration having a pitch angle of the order of 20° to 25°, which extremity is in threaded engagement with a nut portion 38 secured within the end of the valve member 19 which is remote from the thermally responsive element 33.

The adjusting spindle 35 is restrained frictionally against rotation by means of a spring 39 acting between a nut 40 within the discharge member 24 and a friction washer 41, the other end of which engages a shoulder 42 on the exterior of the spindle, while the spindle is further provided with a pointer 43 adapted to co-operate with suitable markings provided on the exterior of the discharge member 24 not shown on the drawing.

With a mixing valve constructed as above described, on the two fluids flowing through the valve member and mixing chamber to the thermally responsive element, in the event of a rise in pressure of the steam occurring beyond its usual value, the rate of steam flow to the mixing chamber will increase with consequent rise in temperature of the mixture, thereby causing the bi-metal strip to alter its shape, and displacing the outer end of the coil in relation to the inner end, and rotating the valve member 19 around the stationary spindle 35, so as to displace the valve member axially by reason of its threaded engagement with the spindle and partially to close the steam supply openings and reduce the flow of steam to the mixing chamber and at the same time increase the cold water flow, thereby maintaining the hot water mixture at the same predetermined temperature despite the increase in the steam pressure.

In the event of the steam pressure falling below the normal so as to decrease the steam flow and reduce the temperature of the mixture, the valve member is displaced similarly in the opposite direction to decrease the cold water flow and still maintain the hot water mixture at the desired temperature.

Similarly in the event of variation in water pressure affecting the rate of flow of the water and producing variation in the temperature of the mixture the bi-metal coil operates to displace the valve so as to maintain the mixture at the predetermined required temperature.

The actual closure or partial closure of the fluid supply openings is effected by the axial movement of the valve member so that the operative or control edges 44 of the valve member ports are not subjected to any appreciable resultant fluid pressure resisting such closure or partial closure, while any tendency for the valve member to be displaced in an axial direction in consequence of the fluid pressure acting on such control edges 44 of the ports is further prevented by the fact that the valve member is in threaded engagement with the adjusting spindle, the pitch of the screwthread being sufficiently low to ensure that the valve member cannot be turned as a result of being subjected to a purely axial pressure.

Thus an effective control of the temperature of the resultant mixture is obtained irrespective of variation in supply pressure of one or more of the supplied fluids.

If it is desired manually to adjust the temperature of the hot water mixture irrespective of the temperature and/or pressure of the steam and cold water supply, this can readily be done by turning the handle 36 on the adjusting spindle, thereby rotating the latter and displacing the valve member.

If desired the position of the pointer 43 in relation to the spindle 35 may be made adjustable for calibration purposes by forming the inner end of the boss of the handle 36 with a series of radially disposed grooves 45 which engage with a correspondingly grooved boss 46 carrying the pointer, the boss 46 being itself capable of rotating freely around the spindle, and the handle in such an arrangement is secured in position on the spindle by a removable nut 47 so that by slackening the nuts, the handle grooves can be disengaged from the pointer grooves, and the pointer adjusted in relation to the spindle as required. Such calibration is of course, necessary in consequence of any angular adjustment of the discharge member which may be made in relation to the valve body as above described when the apparatus is first set up.

It is within the scope of the invention that the supply of one fluid only should be controlled by a valve member having a single port only so as to vary relatively the proportions of the two fluids to be mixed and vary the temperature of the resultant mixture but the arrangements already described are preferred.

If desired, two or more bi-metal coils may be provided either in series or in parallel with one another. In the series arrangement the outer end of one coil may be connected to the valve member 19 with its inner end connected to the outer end of the second coil, the inner end of which second coil is connected to the valve body 10. In the parallel arrangement two coils may be disposed side by side with the outer ends of both coils connected to the valve member and their inner ends both connected to the valve body. The former arrangement provides for a greater displacement of the valve, the latter arrangement provides for a stronger displacing force for actuating the valve.

Referring now to Figures 4 and 5 of the drawings, there is shown a modified form of valve member and seating which is advantageous in that a reduction in the size of the bi-metal element can be achieved and the amount of relative movement required can be reduced without significant sacrifice of port area in the fully opened position for each port.

The construction shown in Figure 4 has valve body 50 with a pair of fluid supply passages 51 and 52 separated by the wall 53. The sleeve like valve seating member 54 is formed with two helical slots 55 and 56 and the valve member 57 has helically arranged slots 58 and 59 which cooperate with the slots 55 and 56 in the seating member 54.

In Figure 5 slots 60 and 61 are provided in the seating member 54 as in Figure 4 but instead of slots in the valve member 59, rows of holes 62 and 63 are provided.

In both cases the slots or rows of holes are arranged helically, as shown, and with the valve in the position in which the inlet in passage 51 is fully open and the inlet in passage 52 is fully closed. When the valve moves to the right as shown in Figures 4 and 5, inlet 51 closes and inlet 52 opens and, due to the helical arrangement of the openings a certain amount of relative axial movement is achieved between the openings in the valve member and those in the seating member because of the rotational movement imparted by the bi-metal element. Thus the same degree of port opening and closing as given by Figure 1 can be achieved with this modification with a reduction in the relative movement required and consequent reduction in the size of the bi-metal element and the valve itself.

What I claim then is:

1. A mixing valve comprising a body including a plurality of supply openings each for supplying one of the fluids to be mixed, a mixing chamber in which mixture of the fluids is effected, a discharge opening for discharging the mixture from the mixing chamber, a thermally responsive element comprising a length of spirally coiled bimetal strip, said body being provided internally with a hollow cylindrical valve seating, a hollow cylindrical valve member mounted within said seating so as to be rotatably and axially displaceable relative to the seating, a valve adjusting spindle extending from one end of the body through the centre of the bi-metal coil and into the hollow interior of the valve member, the latter being provided internally with a nut having threaded engagement with the adjusting spindle, said bi-metal strip being connected at one end to the valve body and at the other end to the valve member and being adapted to impart rotational movement to the valve member in consequence of a change of temperature of the thermally responsive element so that the valve member is both rotated and displaced axially relative to its seating by reason of its threaded connection to the adjusting spindle, said seating and valve member being provided each with one or more ports adapted in co-operation with one another to control the supply of one or more fluids to the mixing chamber, the arrangement being such that when the valve member is displaced axially in one or the other direction, the supply of one fluid to the mixing chamber is increased or decreased in relation to that of another fluid, each valve member port extending radially thereof so that the pressure of the fluid acting on the edges of the ports does not produce any substantial force tending to displace the valve against the controlling action of the thermally responsive element and the adjusting member when rotated serving to displace the valve member axially so as to effect adjustment thereof without transmitting the adjusting movement through the thermally responsive element itself.

2. A valve according to claim 1 wherein the inner end of the bi-metal coil is mounted rigidly on a sleeve rigid with the valve body in the interior of which sleeve the adjusting spindle is rotatably mounted.

3. A mixing valve comprising a body including a plurality of supply openings each for supplying one of the fluids to be mixed, a mixing chamber in which mixture of the fluids is effected, a discharge member having an opening for discharging the mixture from the mixing chamber, a thermally responsive element adapted to change its shape in response to variation of temperature of the mixture, and being arranged so as to permit of the mixture flowing in contact therewith, one end of said thermally responsive element being connected to the body and the other end being operatively connected to a cylindrical valve member mounted within the body, said valve member being mounted for rotational and axial displacement within a seating member fixed in the body, said seating and valve member being provided each with ports adapted in cooperation with one another to control the supply of fluids to the mixing chamber, the arrangement being such that when the valve member is displaced axially in one or the other direction the supply of one fluid to the mixing chamber is increased or decreased in relation to that of another fluid, said ports all being arranged with their major axes inclined, in the same direction, to the direction of relative rotational movement between the valve member and its seating, so that the rotational component of the relative movement between the valve member and seating is utilised in displacing the ports on the valve member relative to the corresponding ports in the seating in a direction transverse to the major axes of the ports.

4. A mixing valve comprising a body including a plurality of supply openings each for supplying one of the fluids to be mixed, a mixing chamber in which mixture of the fluids is effected, a discharge member having an opening for discharging the mixture from the mixing chamber, a thermally responsive element adapted to change its shape in response to variation of temperature of the mixture, and being arranged so as to permit of the mixture flowing in contact therewith, one end of said thermally responsive element being connected to the body and the other end being operatively connected to a cylindrical valve member mounted within the body, said valve member being mounted for rotational and axial displacement within a seating member fixed in the body, said seating and valve member being provided each with ports adapted in cooperation with one another to control the supply of fluids to the mixing chamber, the arrangement being such that when the valve member is displaced axially in one or the other direction the supply of one fluid to the mixing chamber is increased or decreased in relation to that of another fluid, said ports comprising elongated slots with their major axes extending helically, all of the same hand, with respect to the axis of the valve member, so that the rotational component of the relative movement between the valve member and seating is utilised in displacing the slots on the valve member relative to the corresponding slots in the seating in a direction transverse to the major axes of the ports.

5. A mixing valve comprising a body including a plurality of supply openings each for supplying one of the fluids to be mixed, a mixing chamber in which mixture of the fluids is effected, a discharge member having an opening for discharging the mixture from the mixing chamber, a thermally responsive element adapted to change its shape in response to variation of temperature of the mixture, and being arranged so as to permit of the mixture flowing in contact therewith, one end of said thermally responsive element being connected to the body and the other end being operatively connected to a cylindrical valve member mounted within the body, said valve member being mounted for rotational and axial displacement within a seating member fixed in the body, said seating and valve member being provided each with ports adapted in cooperation with one another to control the supply of fluids to the mixing chamber, the arrangement being such that when the valve member is displaced axially in one or the other direction the supply of one fluid to the mixing chamber is increased or decreased in relation to that of another fluid, the ports in the seating member comprising each a continuous slot arranged helically with respect to the axis of the valve member, and the ports in the valve member comprising rows of holes arranged helically with respect to the axis of the valve member, so that the rotational component of the relative movement between the valve member and seating is utilised in displacing the rows of holes on the valve member relative to the corresponding slots in the seating in a direction transverse to the major axes of the ports.

PERCY GEORGE TACCHI.

REFERENCES CITED

The following references are of record in the file of this patent:

UNITED STATES PATENTS

| Number | Name | Date |
| --- | --- | --- |
| 1,940,090 | Hetherington | Dec. 19, 1933 |
| 2,226,200 | Donnelly | Dec. 24, 1940 |
| 2,369,242 | Lawler | Feb. 13, 1945 |

FOREIGN PATENTS

| Number | Country | Date |
| --- | --- | --- |
| 587,165 | Great Britain | Apr. 16, 1947 |